United States Patent
Tanabe

(10) Patent No.: US 6,876,812 B1
(45) Date of Patent: Apr. 5, 2005

(54) VIDEO SIGNAL REPRODUCTION METHOD AND VIDEO SIGNAL REPRODUCTION APPARATUS

(75) Inventor: Kazuya Tanabe, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 1065 days.

(21) Appl. No.: 09/712,937

(22) Filed: Nov. 16, 2000

(30) Foreign Application Priority Data

Nov. 25, 1999 (JP) .......................... P11-334096

(51) Int. Cl.[7] ................................ H04N 5/91
(52) U.S. Cl. .................. 386/68; 386/70; 386/95
(58) Field of Search ........................ 386/68, 69, 70, 386/46, 95, 125–126, 109, 111; H04N 5/91

(56) References Cited

U.S. PATENT DOCUMENTS

| | | | | |
|---|---|---|---|---|
| 5,479,303 A | * | 12/1995 | Suzuki et al. ............... | 386/70 |
| 5,535,008 A | * | 7/1996 | Yamagishi et al. .......... | 386/109 |
| 5,596,564 A | * | 1/1997 | Fukushima et al. ........... | 386/46 |
| 6,064,794 A | * | 5/2000 | McLaren et al. ............. | 386/68 |
| 6,308,003 B1 | * | 10/2001 | Hirabayashi et al. ......... | 386/70 |
| 6,453,116 B1 | * | 9/2002 | Ando et al. .................. | 386/70 |
| 6,470,135 B1 | * | 10/2002 | Kim et al. .................... | 386/95 |
| 6,480,666 B1 | * | 11/2002 | Wilson et al. ............... | 386/125 |

FOREIGN PATENT DOCUMENTS

| | | |
|---|---|---|
| EP | 0 649 255 | 4/1995 |
| EP | 0 729 153 | 8/1996 |
| GB | 2 308 264 | 6/1997 |
| JP | 10-322661 | 12/1998 |

* cited by examiner

*Primary Examiner*—Vincent Boccio
(74) *Attorney, Agent, or Firm*—Nath & Associates PLLC; Gary M. Nath; Gregory B. Kang

(57) ABSTRACT

The types of consecutive k pictures are checked. If there is at least one I picture, the last I picture is output. If there is no I picture, the first P picture is output. If there is neither I picture nor P picture, the last B picture is output. When checking the types of the next plurality of pictures, the types of the first P picture after the output picture and the following pictures included in the consecutive k pictures and the types of the next k pictures following the k consecutive pictures are checked. The same processing is performed thereafter.

4 Claims, 3 Drawing Sheets

VIDEO SIGNAL REPRODUCTION METHOD AND VIDEO SIGNAL REPRODUCTION APPARATUS

BACKGROUND OF THE INVENTION

1. Field of the Invention

The present invention relates to a reproduction method and a reproduction apparatus for speedily reproducing MPEG-compressed video signals recorded on a recording medium.

2. Description of the Related Art

MPEG (Moving Picture Experts Group) compression is known as a compression encoding method for performing the inter-frame compression of video signals. MPEG-compressed signals are composed of GOPs (Group of Pictures), each composed of an I picture generated by intra-frame or intra-field compression, P pictures generated by forward predictive compression, and B pictures generated by bi-directional predictive compression. Each GOP contains one I picture.

When reproducing video signals, at a speed higher than the regular speed, from a recording medium on which MPEG-compressed video signals are recorded, it is difficult to decompress the I picture, all P pictures, and all B pictures because of low processing speed. Therefore, during high-speed reproduction, only part of pictures are decompressed.

FIGS. 1A to 1D show how pictures are output when video signals are reproduced, at a speed higher than the regular speed, from a recording medium on which MPEG-compressed video signals are recorded. In these figures, the vertical axis indicates picture numbers and the horizontal axis indicates the elapsed time. The actual output pictures are indicated by bars, while the ideal output pictures for smooth, high-speed reproduction are jointed by straight lines.

A GOP of MPEG-compressed signals to be reproduced, which is used in the description below, is composed of a total of 15 pictures including one I picture, four P pictures, and ten B pictures. They are in order of $I_1$, $B_2$, $B_3$, $P_4$, $B_5$, $B_6$, $P_7$, $B_8$, $B_9$, $P_{10}$, $B_1$, $B_{12}$, $P_{13}$, $B_{14}$, and $B_{15}$.

Let M be the number of pictures of a GOP, and let N be the number of pictures from a P picture (this P picture not included) to the next P picture or I picture. When the speed multiplier is N or smaller, high-speed reproduction video is generated using I pictures and P pictures. On the other hand, when the speed multiplier is larger than N, high-speed reproduction video is generated using only I pictures.

That is, when the speed is 1.2× or 2× as shown in FIGS. 1A and 1B, the speed multiplier is smaller than 3 and therefore high-speed reproduction video is generated using I pictures and P pictures. On the other hand, when the speed is 4× or 8×, the speed multiplier is larger than 3 and therefore high-speed reproduction video is generated using only I pictures. This reproduction method applies not only to the case when M=15 and N=3 described above but also to other cases. When the speed multiplier is smaller than N, high-speed reproduction video is generated using I pictures and P pictures. On the other hand, when the speed multiplier is larger than N, high-speed reproduction video is generated using only I pictures.

SUMMARY OF THE INVENTION

However, when high-speed reproduction video is generated as described above, the motion of high-speed reproduction video is jerky particular when the video motion is speedy. For example, when the speed multiplier is set to 4 as shown in FIG. 1C, the first picture is used four times and then 16th picture (I picture in the next GOP) is used four times to output high-speed reproduction video. This means a large interval in time between the first picture and the 16th picture. Thus, smooth high-speed reproduction video cannot be obtained.

To solve the above problems, according to an aspect of the present invention, there is provided a video signal reproduction method for speedily reproducing video signals from a recording medium at a reproduction speed k times higher than, a regular reproduction speed, the recording medium recording therein MPEG (Moving Picture Experts Group)—compressed video signals, the method comprising the steps of: providing an algorithm wherein, if there is an I picture in a plurality of consecutive pictures, a last I picture is selected and output, wherein, if there is no I picture, a first P picture is selected and output, and wherein if there is no P picture, one of B pictures is selected and output; if, in the plurality of consecutive pictures, there is no P picture after the output picture, selecting one picture from k pictures following the plurality of pictures according to the algorithm and outputting the selected picture as a picture that follows the output picture; and if, in the plurality of consecutive pictures, there is at least one P picture after the output picture, selecting one picture from a first P picture after the output picture and all following pictures included in the plurality of pictures and k pictures following the plurality of pictures according to the algorithm, and outputting the selected picture as a picture that follows the output picture.

According to the present invention, not only I pictures and P pictures but also B pictures may be used to output high-speed reproduction video. In addition, because the same picture is not used twice, smooth and natural high-speed reproduction video may be obtained.

In a preferred embodiment of the present invention, when the reproduction speed value, k, is not an integer and is represented as $k=k_1+k_2$ ($k_1$ is an integer part of k, and $k_2$ is a fraction part of k), a ratio of the number of using a value of k, as said value of k to the number of using a value of $k_1+1$ as said value of k is determined according to a value of $k_2$ for outputting pictures.

This embodiment gives smooth and natural high-speed reproduction video even when the reproduction speed is not an integral multiple of the regular reproduction speed.

To solve the above problems, according to another aspect of the present invention, there is provided a video signal reproduction apparatus for speedily reproducing video signals from a recording medium at a reproduction speed k times higher than a regular reproduction speed, the recording medium recording therein MPEG-compressed video signals, the apparatus comprising: a reproducer speedily reproducing the video signals from the recording medium; a picture data selector selectively outputting pictures to be expanded from the video signals composed of I pictures, P pictures, and B pictures generated by the reproducer; and a decoder expanding the pictures selectively output by the picture data selector, wherein the picture data selector provides an algorithm wherein, if there is an I picture in a plurality of consecutive pictures, a last I picture is selected and output, wherein, if there is no I picture, a first P picture is selected and output, and wherein if there is no P picture, one of B pictures is selected and output, wherein if, in the plurality of consecutive pictures, there is no P picture after the output picture, the picture data selector selects one picture from k pictures following the plurality of pictures according to the algorithm and outputs the selected picture as a picture that follows the output picture; and wherein if, in the plurality of consecutive pictures, there is at least one P picture after the output picture, the picture data selector selects one picture from a first P picture after the output picture and all following pictures included in the plurality of pictures and k pictures following the plurality of pictures according to the algorithm, and outputs the selected picture as a picture that follows the output picture.

According to the present invention, not only I pictures and P pictures but also B pictures may be used to output high-speed reproduction video. In addition, because the same picture is not used twice, smooth and natural high-speed reproduction video may be obtained.

In a preferred embodiment of the present invention, when the reproduction speed value, k, is not an integer and is represented as $k=k_1+k_2$ ($k_1$ is an integer part of k, and $k_2$ is a fraction part of k), a ratio of the number of using a value of $k_1$ as said value of k to the number of using a value of $k_1+1$ as said value of k is determined according to a value of $k_2$ for outputting pictures.

This embodiment gives smooth and natural high-speed reproduction video even when the reproduction speed is not an integral multiple of the regular reproduction speed.

The nature, principle and utility of the invention will become more apparent from the following detailed description when read in conjunction with the accompanying drawings.

DESCRIPTION OF THE PREFERRED EMBODIMENTS

Figure 1A:
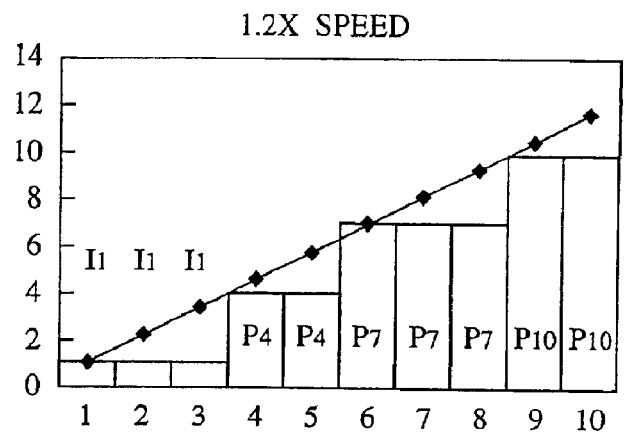
FIGS. 1A to 1D are diagrams showing pictures output by a conventional video signal reproduction method.
Figure 1B:
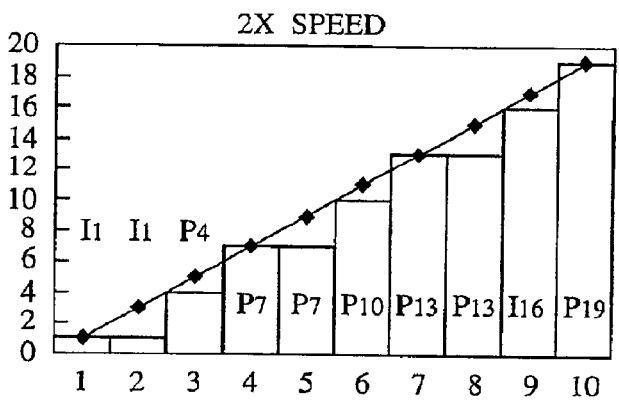
Figure 1C:
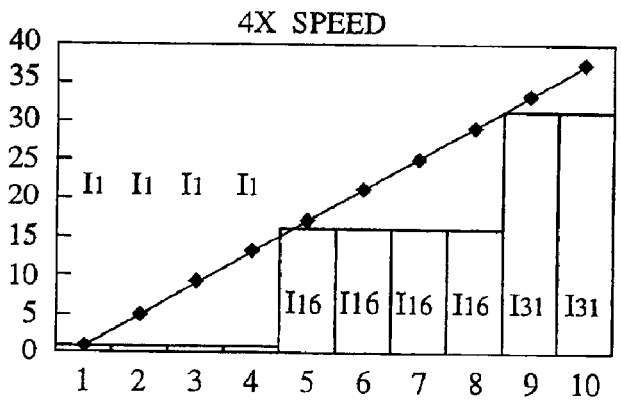
Figure 1D:
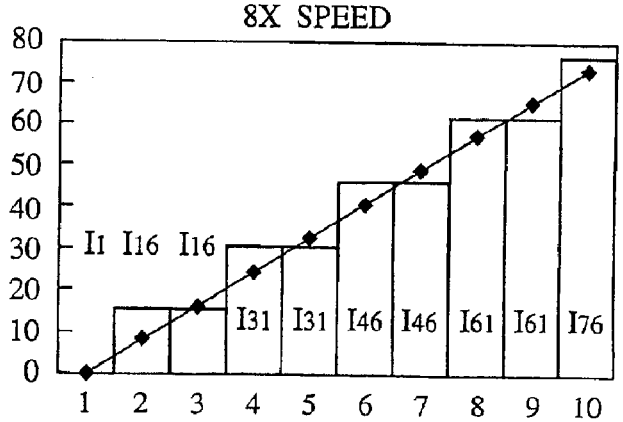
Figure 2:
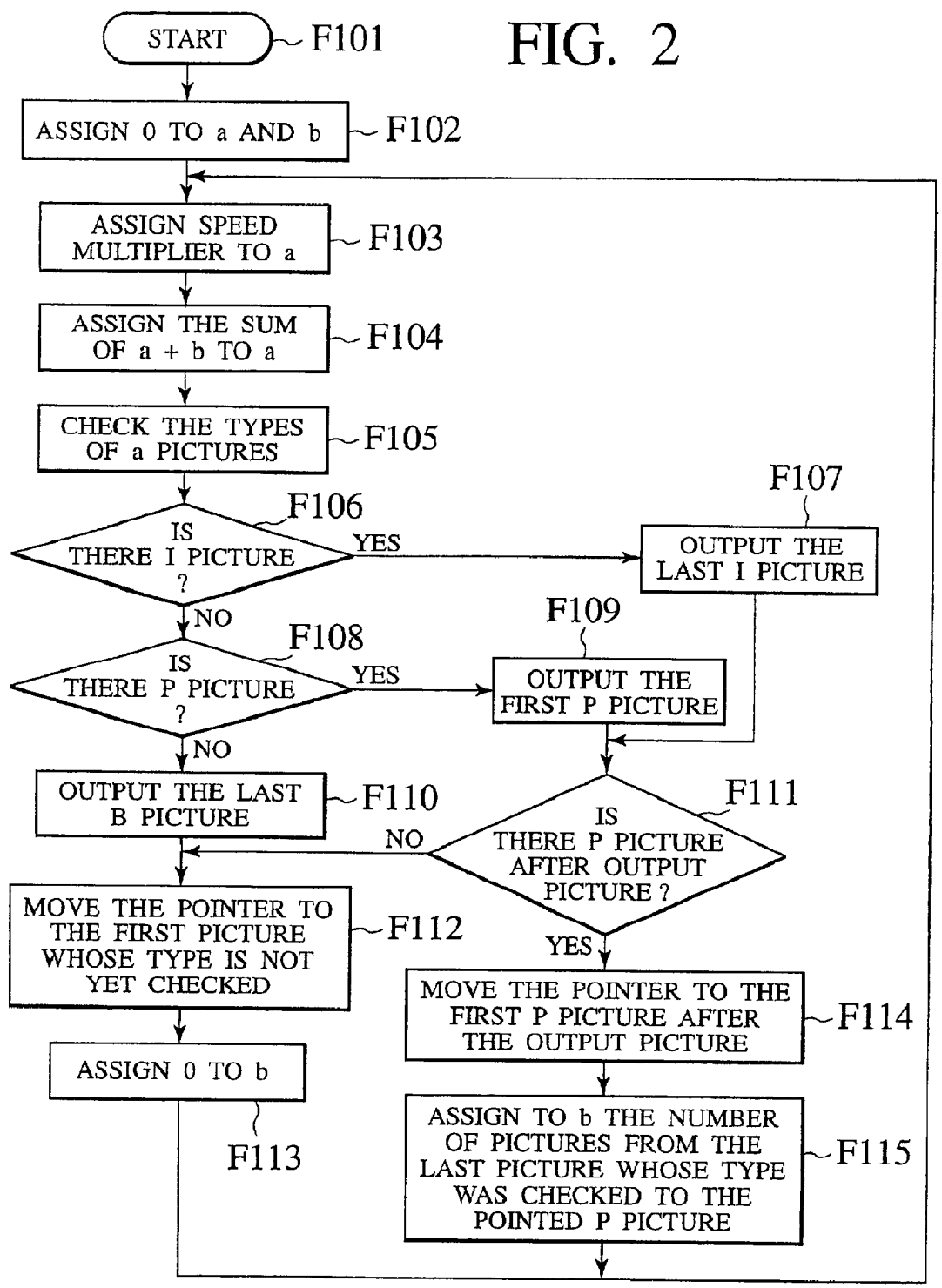
FIG. 2 is a flowchart showing a video signal reproduction method according to the present invention.

FIG. 2 is a flowchart showing a video signal reproduction method according to the present invention. This method outputs not only I pictures and P pictures but also B pictures to generate smooth, high-speed reproduction video. Picture data that is output according to the flowchart shown in FIG. 2 is input to the decoder of a video signal reproduction apparatus according to the present invention, shown in FIG. 3, and is decompressed by the decoder.

First, the characteristics of an I picture, P picture, and B picture will be described briefly. An I picture is created by compressing data included in a frame or a field. Therefore, it is possible to restore video signals by sending only I picture to the decoder.

On the other hand, a P picture is created by the forward predictive compression method. Therefore, to restore video signals correctly, the previous I picture and all P pictures that are present between the previous I picture and the P picture to be decompressed must be decoded.

A B picture is created by the bi-directional predictive compression method. Therefore, to restore video signals correctly, the previous I picture, all P pictures between the previous I picture and the B picture to be decompressed, and the P picture immediately following the B picture to be decompressed (or next I picture if there is no P picture in the same GOP to which the B picture to be decompressed belongs) must be decoded.

Therefore, the video signal reproduction method according to the present invention must decide the pictures to be output while considering the sequence of pictures in a GOP. The video signal reproduction method according to the present invention will be described with reference to FIG. 2. When a reproducer, which will be described later, reproduces the data of each picture of a GOP (F101), variables a and b are initialized to 0 (F102) and then the reproduction speed multiplier is assigned to a (F103). b is added to a, and the resulting value is assigned to a (F104). Then, a pictures are checked for type (F105).

For convenience, the MPEG-compressed signals of a GOP of 15 pictures described above, $I_1$, $B_2$, $B_3$, $P_4$, $B_5$, $B_6$, $P_7$, $B_8$, $B_9$, $P_{10}$, $B_{11}$, $B_{12}$, $P_{13}$, $B_{14}$, and $B_{15}$, are decompressed at a 4× reproduction speed in the example below.

When reproducing at a 4× speed, the value of 4 is assigned to a in F104 because the speed multiplier is 4 and the initial value of b is 0. In F105, four pictures, $I_1$, $B_2$, $B_3$, and $P_4$, are checked for type. A check is made if these four pictures include an I picture (F106). Because there is an I picture, the last I picture, $I_1$, is output (F107).

Next, a check is made if there is a P picture after the picture that has been output (F111). Because there is a P picture in this case, $P_4$ is pointed which is the first P picture after the picture that has been output (F114). Then, the sequence number of the pointed picture from the last of the four pictures $I_1$, $B_2$, $B_3$, and $P_4$, whose types have already been checked, is assigned to b (F115). In this case, the value of 1 is assigned to b, and control is passed back to F103.

When the value of 1 is assigned to b, then a=4 and b=1. In F104, the value of 5 is assigned to a. Therefore, in F105, the five pictures beginning at the pointed position, $P_4$, $B_5$, $B_6$, $P_7$, and $B_8$, are checked for picture type. Because there is no I picture but there are P pictures, 'No' is selected in F106 and 'Yes' is selected in F108.

Then, the first P picture, $P_4$, is output (F109) and, in addition, a check is made if there is a P picture after the picture that has been output (F111). In this case, there is a P picture. So, $P_7$ is pointed which is the first P picture after the picture that has been output (F114). In this case, among the pictures whose types have been checked, $p_7$ is the last but one. Therefore, the value of 2 is assigned to b in F115 and control is passed back to F103.

When the value of 2 is assigned to b, then a=4 and b=2. In F105, the six pictures, $P_7$, $B_8$, $B_9$, $P_{10}$, $B_{11}$, and $B_{12}$ are checked for picture type. Because there is no I picture but there are P pictures, 'No' is selected in F106 and 'Yes' is selected in F108.

Then, the first P picture, $P_7$, is output (F109) and, in addition, a check is made if there is a P picture after the picture that has been output (F111). In this case, there is a P picture. So, $P_{10}$ is pointed which is the first P picture after the picture that has been output (F114). In F115, the value of 3 is assigned to b, and control is passed back to F103.

In this state, a=4 and b=3. Therefore, in F105, the seven pictures, $P_{10}$, $B_{11}$, $B_{12}$, $P_{13}$, $B_{14}$, $B_{15}$, and $I_{16}$, are checked for picture type. Because there is an I picture in these pictures, 'Yes' is selected in F106 and the last I picture, $I_{16}$, is output (F107). In addition, because there is no P picture after the picture that has been output (F111), $B_{17}$ which is the first picture that is not checked for type is pointed (F112). Then, the value of 0 is assigned to b (F113) and control is passed back to F103.

Processing continues similarly beginning in F103, with the result that picture data is output to the decoder in order of $I_1, P_4, P_7, I_{16}, P_{19}, P_{22}, P_{25}, I_{31}, P_{34}, P_{37}$, and so on. In the above description, the processing shown in F110, in which the last B picture is output when neither I picture nor P picture is present, is not performed.

When neither I picture nor P picture is present, decompression may be performed even if the last B picture is not output. The last B picture, if output, would generate high-speed reproduction video that is more smooth.

When the speed multiplier is not an integer, the average of the integer values assigned to a in F103 should be set to the speed multiplier. That is, for the 1.2× speed, the value of 1 is assigned to a four times, and then the value of 2 is assigned to the a once. By repeating this assignment processing, the average of the values assigned to the variable a becomes 1.2. More specifically, since the fraction part of 1.2 is 0.2, the value of 2 which is larger by 1 than 1 that is the integer part of 1.2 is assigned to a every five times and the value of 1 is assigned to a every other time.

FIGS. 4A to 4D show pictures that are input to the decoder for each of speeds, that is, 1.2×, 2×, 4×, and 8×. As in FIGS. 1A to 1D, the vertical axis indicates picture numbers and the horizontal axis indicates the elapsed time. The actual output pictures are indicated by bars, while the ideal output pictures for smooth, high-speed reproduction are jointed by straight lines.

In the video signal reproduction method according to the present invention, the numbers of pictures that are actually output almost match those of pictures ideal for getting smooth high-speed reproduction video, as shown in those figures. Another advantage of this method is that the same picture is not output two or more times, making the high-speed reproduction video smoother and more natural.

Figure 3:
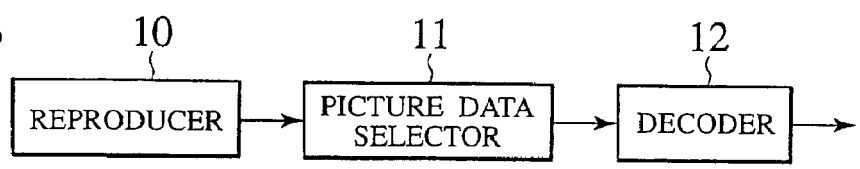
FIG. 3 is a diagram showing a video signal reproduction apparatus according to the present invention.
Figure 4A:
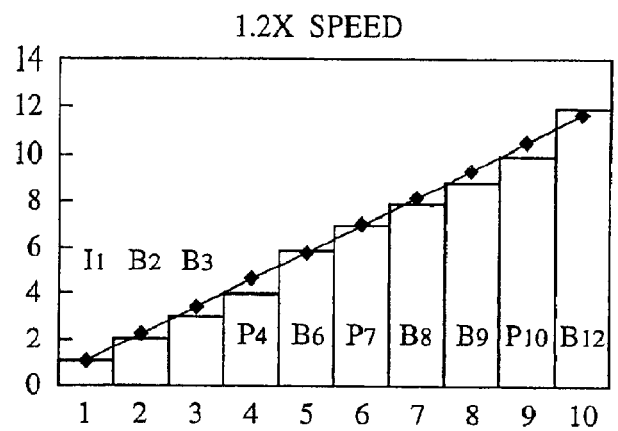
FIGS. 4A to 4D are diagrams showing pictures that are input to a decoder based on the video signal reproduction method according to the present invention.
Figure 4B:
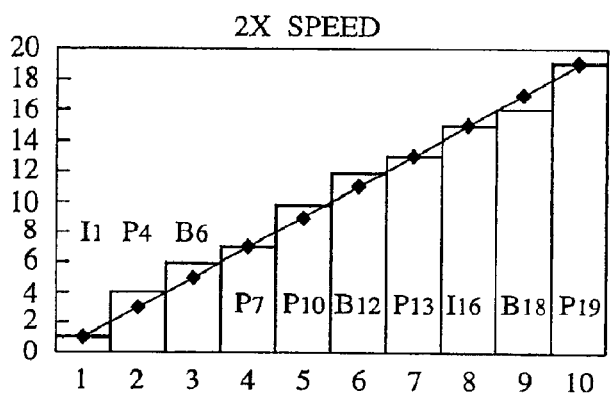
Figure 4C:
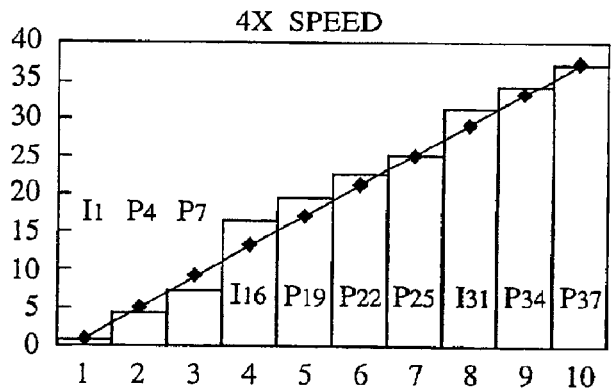
Figure 4D:
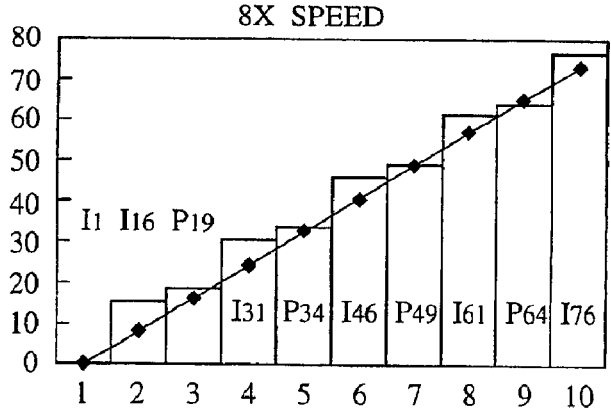

Next, a video signal reproduction apparatus according to the present invention for use with the video signal reproduction method described above will be described. FIG. 3 is a diagram illustrating the video signal reproduction apparatus according to the present invention. Number 10 is a reproducer which reproduces MPEG-compressed video signals from a recording medium. The reproducer 10 reproduces all picture data of the GOP pictures when performing high-speed reproduction as described above.

Number 11 is a picture data selector which executes the steps in the flowchart shown in FIG. 2. This selector outputs only the picture data, selected according to the high-speed reproduction multiplier, to a decoder 12. When the reproducer 10 performs regular-speed reproduction (1× reproduction), the picture data selector 11 does not select picture data reproduced by the reproducer 10 but outputs all data to the decoder 12.

The same number of pictures are output from the picture data selector 11 to the decoder 12 per unit time both at regular reproduction time and at high-speed reproduction time. Therefore, the decoder 12 may generate high-speed reproduction video without increasing the processing speed.

It should be understood that many modifications and adaptations of the invention will become apparent to those skilled in the art and it is intended to encompass such obvious modifications and changes in the scope of the claims appended hereto.

What is claimed is:

1. A video signal reproduction method for speedily reproducing video signals from a recording medium at a reproduction speed k times higher than a regular reproduction speed, the recording medium recording therein MPEG (Moving Picture Experts Group)—compressed video signals, said method comprising the steps of:

providing an algorithm wherein, if there is an I picture in a plurality of consecutive pictures, a last I picture is selected and output, wherein, if there is no I picture, a first P picture is selected and output, and wherein if there is no P picture, one of B pictures is selected and output;

if, in said plurality of consecutive pictures, there is no P picture after the output picture, selecting one picture from k pictures following said plurality of pictures according to said algorithm and outputting the selected picture as a picture that follows said output picture; and if, in said plurality of consecutive pictures, there is at least one P picture after the output picture, selecting one picture from a first P picture after said output picture and all following pictures included in said plurality of pictures and k pictures following said plurality of pictures according to said algorithm, and outputting the selected picture as a picture that follows said output picture.

2. The video signal reproduction method according to claim 1 wherein, when said reproduction speed value, k, is not an integer and is represented as $k=k_1+k_2$ ($k_1$ is an integer part of k, and $k_2$ is a fraction part of k), a ratio of the number of using a value of $k_1$ as said value of k to the number of using a value of $k_1+1$ as said value of k is determined according to a value of $k_2$ for outputting pictures.

3. A video signal reproduction apparatus for speedily reproducing video signals from a recording medium at a reproduction speed k times higher than a regular reproduction speed, the recording medium recording therein MPEG-compressed video signals, said apparatus comprising:

a reproducer speedily reproducing the video signals from the recording medium;

a picture data selector selectively outputting pictures to be expanded from the video signals composed of I pictures, P pictures, and B pictures generated by said reproducer; and a decoder expanding the pictures selectively output by said picture data selector;

wherein said picture data selector provides an algorithm wherein, if there is an I picture in a plurality of consecutive pictures, a last I picture is selected and output, wherein, if there is no I picture, a first P picture is selected and output, and wherein if there is no P picture, one of B pictures is selected and output;

wherein if, in said plurality of consecutive pictures, there is no P picture after the output picture, said picture data selector selects one picture from k pictures following said plurality of pictures according to said algorithm and outputs the picture as a picture that follows said output picture; and wherein if, in said plurality of consecutive pictures, there is at least one P picture after the output picture, said picture data selector selects one picture from a first P picture after said output picture and all following pictures included in said plurality of pictures and k pictures following said plurality of pictures according to said algorithm, and outputs the selected picture as a picture that follows said output picture.

4. The video signal reproduction apparatus according to claim 3 wherein, when said reproduction speed value, k, is not an integer and is represented as $k=k_1+k_2$ ($k_1$ is an integer part of k, and $k_2$ is a fraction part of k), a ratio of the number of using a value of $k_1$ as said value of k to the number of using a value of $k_1+1$ as said value of k is determined according to a value of $k_2$ for outputting pictures.

* * * * *